June 29, 1926.
J. R. GAMMETER
1,590,360
METHOD AND APPARATUS FOR ASSEMBLING SHEET MATERIAL
Filed May 16, 1922
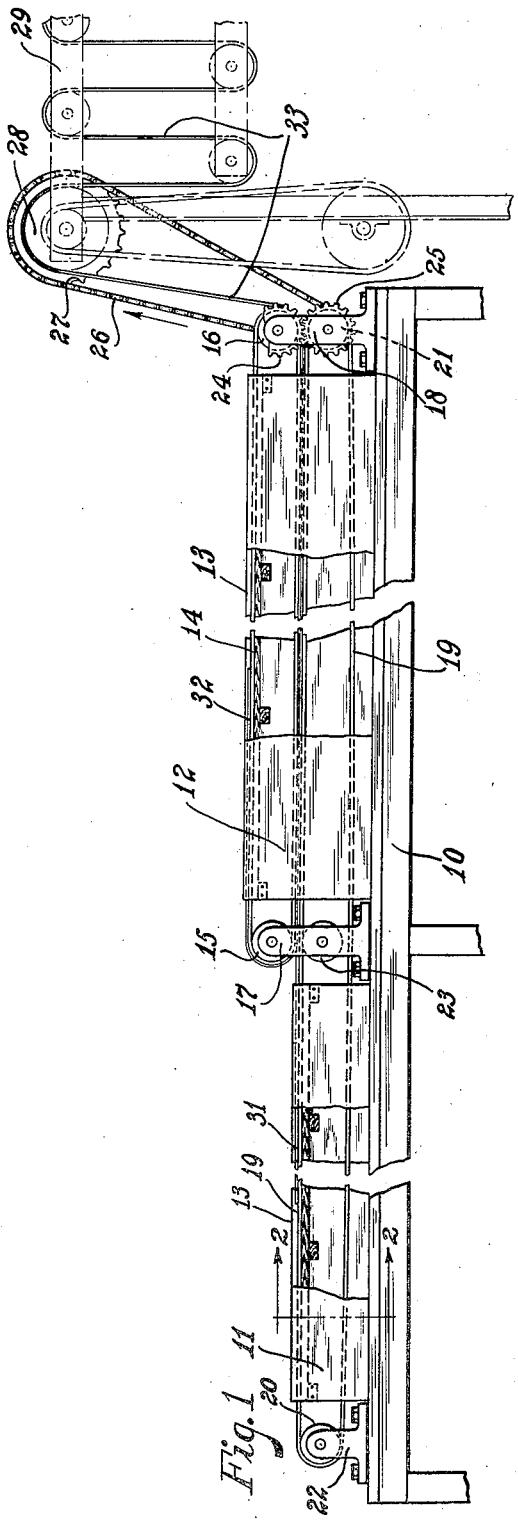
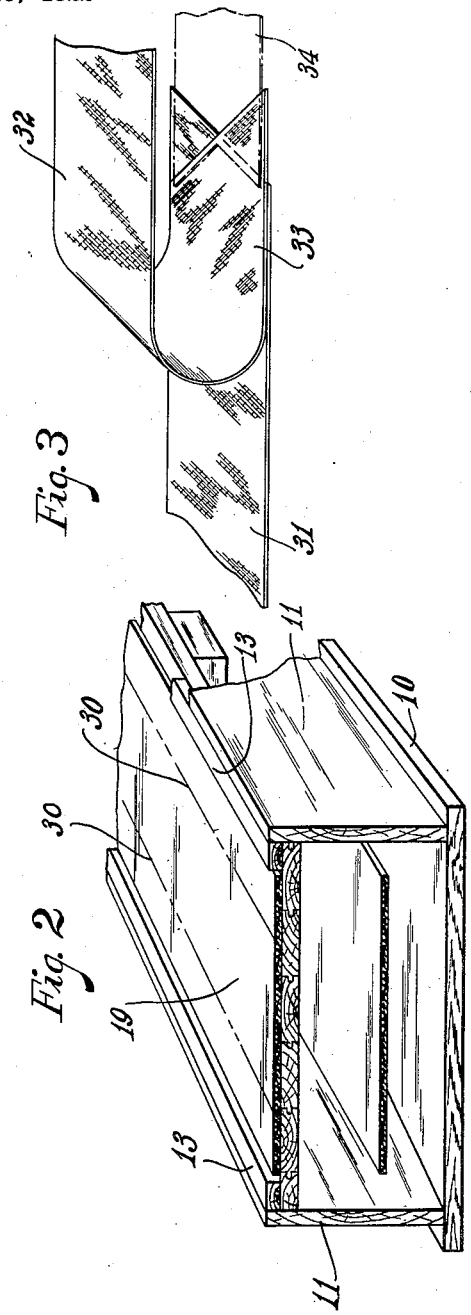
Inventor
John R. Gammeter.
By Robert M. Pierson
Atty.

Patented June 29, 1926.

1,590,360

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR ASSEMBLING SHEET MATERIAL.

Application filed May 16, 1922. Serial No. 561,550.

This invention relates to methods and apparatus for assembling sheet material, an example being the assembling of relatively short, bias-cut strips of rubberized tire building fabric into suitable lengths to be drawn onto a form or core in the construction of pneumatic tires. In the case of weak-wefted or weftless cord fabric, for example, it is desirable that one layer or strip of the fabric be superimposed upon another, with the threads of the respective layers or plies disposed at an angle to each other, and the strips adhesively secured to each other, in order that the assembled tire building strip may have sufficient strength and resistance to distortion properly to withstand the stretching thereof onto the core.

My objects are to provide an improved method and a simple, accurate and efficient apparatus for assembling strips of sheet material.

Of the accompanying drawings:

Fig. 1 is a side elevation of a preferred form of my improved apparatus, and the work in place, with parts broken away.

Fig. 2 is a perspective view of a part thereof, sectioned on line 2—2 of Fig. 1.

Fig. 3 is a perspective view of a part of the work, showing the manner in which the strips are brought together.

Referring to the drawings, 10 is a table upon which are mounted two horizontal, aligned belt-supports, 11 and 12, having the structure of inverted troughs with open ends, each of the same thus forming a tunnel through which an endless belt may pass, and each being provided upon its uppermost surface with side guides 13, 13 for an endless belt.

The belt-support 12 is substantially higher than the belt-support 11, and its upper face slidingly supports the upper reach of an endless belt 14 mounted upon rolls 15, 16 each journaled in a pair of standards, one of each pair being shown at 17 and 18, respectively, said pairs of standards being mounted upon the table 10 at the respective ends of said belt-support, and the lower reach of said belt lying within the tunnel formed by said belt-support.

In similar relation to the belt-support 11, is an endless belt 19 mounted upon rolls 20, 21, the roll 20 being journaled in standards, one of which is shown at 22, mounted upon the table 10 at the outer end of said belt-support, and the roll 21 being mounted below and adjacent to the roll 16, in the standards 18 at the outer end of the belt-support 12. The upper belt 14 thus lies directly over and in alignment with a portion of the lower belt 19, with its lower reach in juxtaposition to the upper reach of the latter, within the tunnel formed by the belt-support 12, while the rest of the lower belt, 19, extends from said tunnel, its upper reach resting upon the belt-support 11, where it is accessible to the operator. 23 is a belt-supporting roll, within the lower belt 19, journaled in the standards 17 below and adjacent to the roll 15 of the upper belt, said rolls being thus adapted to hold the upper reach of the lower belt and the lower reach of the upper belt in close proximity to each other.

The shafts of the belt-supporting rolls 16, 21 are provided with intermeshed gears 24, 25 and the shaft of the latter is also provided with a sprocket (not shown) connected by a drive chain 26 with a sprocket 27 secured to the shaft of a feed roll 28 journaled in the frame of a festooning rack 29 and adapted to be driven by any known or suitable mechanism. I do not wholly limit my claims, however, to this specific means for driving the endless belts.

The outer faces of the belts 14 and 19 may be provided with parallel, longitudinal lines, as indicated at 30, 30, (Fig. 2), to facilitate the accurate placing of the work thereon. 31 is a strip of sheet material such as weak-wefter or weftless tire fabric resting upon the upper reach of the lower belt 19, and 32 is a similar strip upon the upper belt 14. 33 is a combination strip formed by the joinder of the two, face to face, and 34 is a leader strip which may be used to join successive tire lengths of the strip 33 so that the combined strip may be drawn in a continuous length through the festooning rack.

In the operation of the apparatus in the plying up of weak-wefted or weftless cord fabric for tires, for example, relatively short bias cut strips, as they come from the bias cutter, are successively spliced, end to end, upon the upper reach of the lower belt 19 where the latter is supported by the belt-support 11, with the strength giving threads of said strips lying obliquely with respect to said belt. Other such strips are similarly joined, end to end, upon the upper reach of the upper belt 14, over the belt-support 12, with their strength giving threads lying in the same direction as those on the lower belt 19. A continuous strip of substantial length being thus formed on each of the belts, and carefully positioned thereon in alignment with each other by the aid of the marks 30, 30, the belts are driven, from the feed roll 28 of the festooning rack, through the chain 26, gears 24, 25, etc., carrying the two strips together between the belts 14 and 19 at the point where the latter are supported by the rolls 15 and 23, said strips being thereby pressed together, face to face, with the threads of one lying cross-wise of the threads of the other, the upper strip, 32, being inverted, and the tacky condition of the rubber of which they are in part composed causes them to adhere together, forming the combination strip 33. Lengths of the strip 33 each sufficient to form one tire may be joined by leader strips such as the strip 34, so as to facilitate the stretching of the stock onto the tire core, the leader strip being removed after it has served to pull the leading end of the adjacent tire strip onto the core. The plied-up strip is carried forward from the roller 23 by the adjacent reaches of the two belts, passing between the rollers 16 and 21, and as it emerges from the latter may be fed into a festooning rack, as shown, or otherwise disposed of.

The endless belts, supported respectively by the members 11 and 12, afford the operator substantial supports for the work during the splicing operation, and the spliced strips require only to be accurately placed with respect to the lines 30, 30 to assure that they will be brought together in proper registry. A further advantage is that the spliced strips are brought into contact with each other progressively, whereby wrinkles in the fabric are avoided, and are firmly pressed together so that they adhere to each other.

Modifications may be resorted to without departing from the scope of my invention, and I do not wholly limit my claims to the specific construction shown.

I claim:

1. The method of assembling relatively short, bias-cut strips of tire fabric into relatively long tire-building strips which comprises splicing together a plurality of said relatively short strips at one position, similarly splicing together another set of such strips at another position, feeding the resulting spliced strips from said splicing positions to a common point, and there progressively feeding them into face-to-face contact with each other.

2. The method of assembling tire-building material which comprises splicing together relatively short strips of the material in one position, splicing together other strips in another position aligned with the first mentioned position, feeding the resulting spliced strips from said splicing positions to a common point, and there joining them face-to-face with rolling pressure.

3. Apparatus for assembling tire-fabric comprising means for supporting a plurality of pieces of said fabric while the latter are being spliced, means for similarly supporting other pieces of said fabric, and means for progressively drawing respective units of the work from said supporting means into face-to-face contact with each other.

4. Apparatus for assembling tire-fabric comprising a pair of endless belts adapted to carry respective units of said fabric into face-to-face contact with each other, and a smooth surfaced member adapted slidingly to support a reach of one of said belts.

5. Apparatus for assembling sheet material comprising a pair of endless belts adapted to carry respective units of said material into face-to-face contact with each other, supporting rolls for said belts adapted to press the latter together upon the work, and means for supporting a reach of one of said belts substantially in a plane.

6. Apparatus for assembling sheet material comprising a horizontally disposed endless belt, a second endless belt overlying a part of the first belt in alignment therewith, and means for slidingly supporting the upper reach of each of said belts.

7. Apparatus for assembling sheet material comprising an endless belt, a second endless belt overlying a part of the first belt in alignment therewith, and a roll intermediately positioned with respect to the end mountings of the first belt and adapted to hold the latter in proximity to the second belt.

8. In apparatus for assembling tire building material the combination of a pair of endless belts adapted to feed respective units of the work into face-to-face contact with each other, means posterior to said endless belts for supporting a variable supply of said material, feeding means associated therewith, and driving means operatively connecting said feeding means with said endless belts.

9. Apparatus for assembling sheet material comprising a pair of endless belts adapted to carry respective units of the work into face-to-face contact with each other, said belts being provided with marks upon their surfaces to facilitate the positioning of the work thereon.

10. The method of assembling strips of rubberized cord fabric which comprises pressing a bias-cut strip of said fabric onto another such strip having its warp threads crossing those of the first strip, thereby forming successive lengths of the combined strip, and joining such successive lengths by leaders, to form a continuous strip.

In witness whereof I have hereunto set my hand this 8th day of May, 1922.

JOHN R. GAMMETER.